(12) United States Patent
Sherman (10) Patent No.: US 11,218,030 B2
(45) Date of Patent: Jan. 4, 2022

(54) SYSTEM AND METHOD FOR DETERMINING Q FACTOR

(71) Applicant: Powermat Technologies Ltd., Petach Tikva (IL)

(72) Inventor: Itay Sherman, Hod HaSharon (IL)

(73) Assignee: Powermat Technologies Ltd., Petach Tikva (IL)

( * ) Notice: Subject to any disclaimer, the term of this patent is extended or adjusted under 35 U.S.C. 154(b) by 0 days.

(21) Appl. No.: 17/059,914

(22) PCT Filed: May 29, 2019

(86) PCT No.: PCT/IL2019/050611
§ 371 (c)(1),
(2) Date: Nov. 30, 2020

(87) PCT Pub. No.: WO2019/229750
PCT Pub. Date: Dec. 5, 2019

(65) Prior Publication Data
US 2021/0167636 A1 Jun. 3, 2021

Related U.S. Application Data

(60) Provisional application No. 62/678,276, filed on May 31, 2018.

(51) Int. Cl.
*H02J 50/60* (2016.01)
*H02J 50/50* (2016.01)
*H02J 50/12* (2016.01)

(52) U.S. Cl.
CPC ............. *H02J 50/60* (2016.02); *H02J 50/12* (2016.02); *H02J 50/50* (2016.02)

(58) Field of Classification Search
CPC .. H02J 5/005; H02J 7/025; H02J 50/10; H02J 50/12; H02J 50/50; H02J 50/502; H02J 50/60
See application file for complete search history.

(56) References Cited

U.S. PATENT DOCUMENTS

| | | |
|---|---|---|
| 2011/0095618 A1 | 4/2011 | Schatz et al. |
| 2012/0184338 A1 | 7/2012 | Kesler et al. |

(Continued)

FOREIGN PATENT DOCUMENTS

| | | |
|---|---|---|
| FR | 3043275 A1 | 5/2017 |
| KR | 20180010796 A | 1/2018 |

(Continued)

OTHER PUBLICATIONS

International Preliminary Report on Patentability Chapter I dated Dec. 1, 2020 for PCT International Application No. PCT/IL2019/050611.

(Continued)

*Primary Examiner* — Levi Gannon
(74) *Attorney, Agent, or Firm* — Volpe Koenig (57) ABSTRACT

According to a first aspect of the present disclosed subject matter, a method for detecting foreign objects by a host transmitter inductively coupled with a repeater, the method comprising: obtaining a Q-factor from a receiver placed on the repeater; measuring a decay pattern of at least one joint resonance frequency (JRF); determining a Q-factor of the repeater based on the decay pattern; and determining foreign object presence based on the Q-factor of the repeater and a corrected Q-factor obtained from the receiver.

11 Claims, 3 Drawing Sheets

(56) References Cited

U.S. PATENT DOCUMENTS

| | | |
|---|---|---|
| 2014/0111019 A1 | 4/2014 | Roy et al. |
| 2015/0236546 A1 | 8/2015 | Kesler et al. |
| 2017/0117755 A1 | 4/2017 | Muratov et al. |
| 2017/0117756 A1* | 4/2017 | Muratov .................. H02J 7/025 |
| 2017/0366048 A1* | 12/2017 | Watanabe ............ H04B 5/0093 |
| 2018/0115197 A1* | 4/2018 | Li ........................... H02J 50/80 |
| 2018/0131243 A1* | 5/2018 | Hamaguchi ............. H02J 50/80 |
| 2018/0233956 A1* | 8/2018 | Moussaoui ............. H02J 50/80 |
| 2018/0241257 A1* | 8/2018 | Muratov ................. H02J 50/12 |
| 2018/0337557 A1* | 11/2018 | Chen ................... H02J 7/00045 |
| 2019/0109499 A1* | 4/2019 | Smith ................... H02M 3/156 |
| 2019/0140489 A1* | 5/2019 | Liu .................... G01R 27/2688 |
| 2019/0296590 A1* | 9/2019 | Chae ....................... H02J 50/12 |
| 2019/0326782 A1* | 10/2019 | Graham .................. H02J 7/025 |

FOREIGN PATENT DOCUMENTS

| | | |
|---|---|---|
| WO | 2018/163170 A1 | 9/2018 |
| WO | 2018163177 A1 | 9/2018 |

OTHER PUBLICATIONS

International Search Report dated Sep. 24, 2019 for PCT International Application No. PCT/IL2019/050611.

* cited by examiner

SYSTEM AND METHOD FOR DETERMINING Q FACTOR

CROSS-REFERENCE TO RELATED APPLICATION

This application claims priority from U.S. Provisional Patent Application No. 62/678,276, by Itay Sherman, titled "Q factor estimation for repeater Tx", filed on May 31, 2018, which is incorporated in its entirely by reference for all purposes.

TECHNICAL FIELD

The present disclosed subject matter relates to wireless power charging systems. More particularly, the present disclosed subject matter relates to determining Q factor for wireless chargers that use repeaters.

BACKGROUND

Wireless power charging systems are usually deployed in public venues, such as restaurants, coffee shops, airports, bus stations, train stations, banks, schools, libraries, hotels, official building, or the like. Typically, the systems are installed on top of decorative surfaces, such as tables, bars, or the like that are accessible to users, thus require a seamless, and hazard free installation.

To meet these requirements, without damaging the decorative surfaces, one or more repeaters may be mounted on the surface while the power charging transmitter should be concealed under the surface. In such extended distance between the power transmitter and a charged device the repeater is serving for sustaining/enhancing the wireless charging capability. Such topology poses an issue of foreign objects placed on the charging surface that may impact the inductance between the transmitter, charging surface (repeater) and a charged device (receiver).

As suggested by the wireless power consortium (WPC), commercially available system uses Q factor measurement and reported Q factor, of the receiver, in order to detect foreign object placed on a transmitter. However, the issue of detecting foreign object systems that utilize repeaters remains unsolved.

A quality factor or Q factor is a parameter describing dissipation of energy stored in an resonance circuit and characterizes its bandwidth relative to its designated frequency. Higher Q indicates a lower rate of energy loss, i.e. oscillations decay is slower. The general definition of the Q factor is based on the ratio of apparent power to the power losses in a device. From this definition, the quality factor of a coil results to: $Q=2\pi fL/R$, where [f] is frequency; [L] is inductance; [R] is resistance and where Q can have a value between 0 and infinity.

BRIEF SUMMARY

According to a first aspect of the present disclosed subject matter, a method for detecting foreign objects, by a host transmitter inductively coupled with a repeater, the method comprising: obtaining a Q-factor from a receiver placed on the repeater; measuring a decay pattern of at least one joint resonance frequency (JRF); determining a Q-factor of the repeater based on the decay pattern; and determining foreign object presence based on the Q-factor of the repeater and a corrected Q-factor obtained from the receiver.

In some exemplary embodiments, the measuring a decay pattern further comprising excitation, by the host transmitter, of the transmitter primary coil and measuring the decay pattern after the excitation, wherein the excitation comprising at least one sequence of pulses each having a base frequency, and wherein the decay pattern has an oscillation frequency corresponding a first JRF and a second JRF.

In some exemplary embodiments, the base frequency is empirically achieved, frequency, and wherein the measuring the decay pattern after the excitation, comprising measuring the decay pattern of both JRFs for each sequence.

In some exemplary embodiments, the base frequency is substantially near the first JRF, and wherein the measuring the decay pattern after the excitation, comprising measuring the decay pattern of the first JRF.

In some exemplary embodiments, the excitation comprising having an additional sequence of pulses having a base frequency substantially near the second JRF, and wherein the measuring the decay pattern after the excitation, comprising measuring the decay pattern of the second JRF for each sequence.

In some exemplary embodiments, determining the Q-factor of the repeater is also based on a decay factor of the decay pattern for an oscillation of at least one JRF In some exemplary embodiments, the determining foreign object presence further comprises calculating the corrected Q-factor obtained from the receiver by the host transmitter.

In some exemplary embodiments, the determining foreign object presence further comprises comparing the corrected Q-factor to the Q factor of the repeater, and wherein at least one foreign object presence is detected if the Q factor of the repeater is smaller than the corrected Q-factor.

In some exemplary embodiments, after the at least one foreign object presence is detected the host transmitter either stop or minimize powering the repeater.

In some exemplary embodiments, the method is repeated periodically upon the at least one foreign object presence is detected.

In some exemplary embodiments, the method is repeated periodically.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Figure 1:
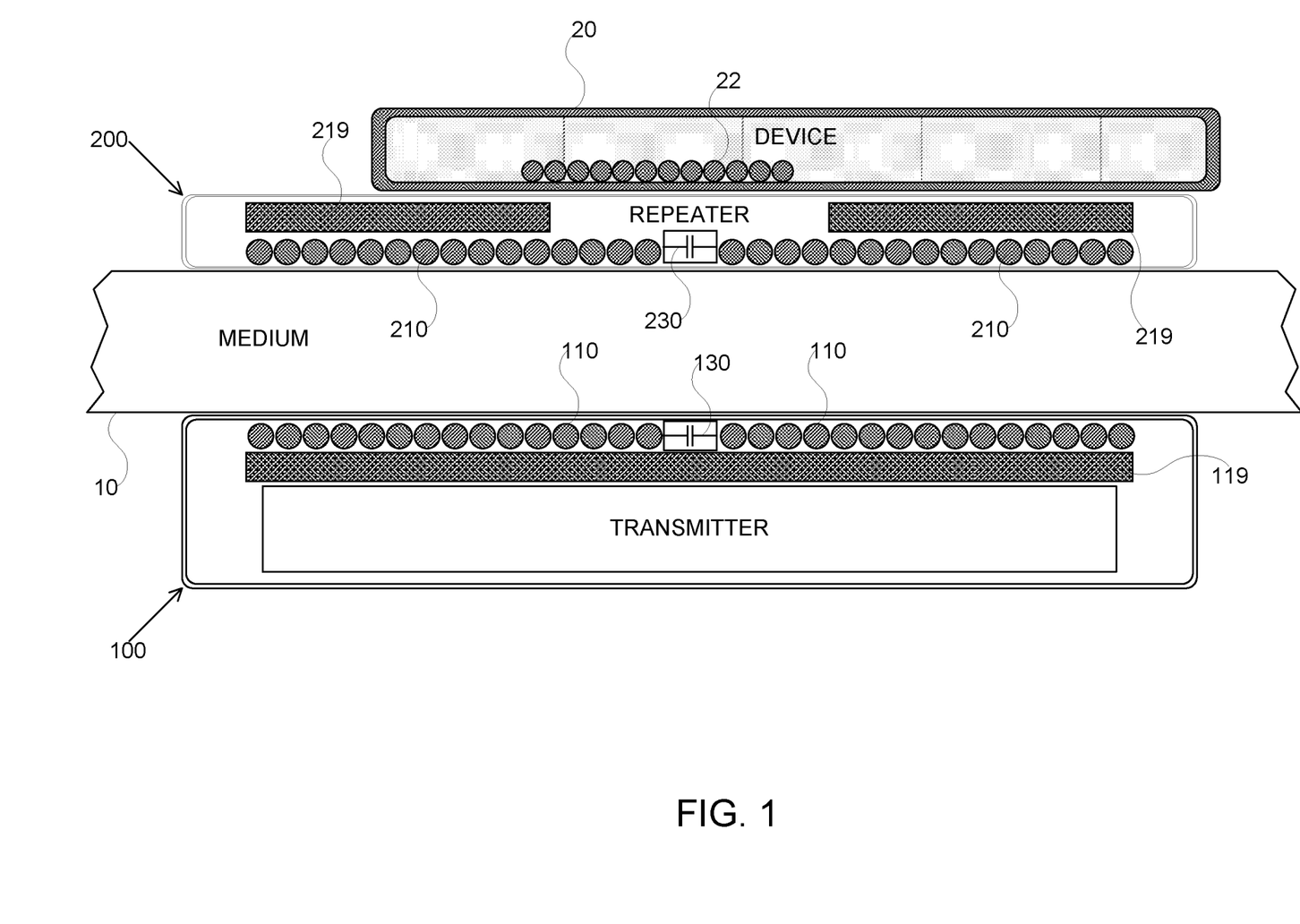
FIG. 1 shows a cross-section view of a layout of a wireless power charging system, in accordance with some exemplary embodiments of the disclosed subject matter.

Referring now to FIG. 1 showing a cross-sectional view of an installation of wireless power charging system, in accordance with some exemplary embodiments of the disclosed subject matter. The wireless power charging system may be comprised of a transmitter 100 and at least one repeater 200.

In some exemplary embodiments, transmitter 100 may be mounted on one side of a medium 10, whereas the repeater 200 may be mounted on the opposite side of the medium 10. The medium 10 may be made of any material that doesn't conduct electricity, such as for example wood, plastic granite, marble, a combination thereof, or the like. It will be noted that in the present disclosure, medium 10 refers to surfaces, such as tables, desks, bars, or the like that are accessible to users in public venues. For example: restaurants, coffee shops, airports, bus stations; train stations, banks, schools, libraries, hotels, official building, or the like.

In some exemplary embodiments, the transmitter 100 comprises a transmitter coil (Lt) 110; a transmitter capacitor (Ct) 130; a transmitter ferrite 119, and a transmitter electronics; all incorporated inside a transmitter enclosure that may be secured to medium 10.

In some exemplary embodiments, the repeater 200 may comprise a repeater coil (Lr) 210; a repeater ferrite 219, and a repeater capacitor (Cr) 230; all incorporated in a repeater enclosure that may be secured to an opposite side of medium 10. The repeater enclosure may have a shape and form factor of a mat, a pad, a saucer, a coaster, a combination thereof, or the like. The repeater 200 can be secured to medium 10 in a way that guarantee overlapping with transmitter 100. It will be noted that, repeater 200 and transmitter 100 overlap each other so that Lt 110 and Lr 210 shall be substantially aligned, to face one another, for optimizing inductance between the two, as depicted in FIG. 1.

In some exemplary embodiments, transmitter 100, can be configured to utilize the repeater 200 for inductively (wirelessly) charge device 20 placed on repeater 200. Device 20 may be a user's device such as a tablet, a laptop a smartphone, or any chargeable mobile handsets that comprise a receiver coil 22 configured to receive inductive power for charging a battery of the device 20.

Similar to Lr 210 and Lt 110, coil 22 and Lr 210 may substantially face and overlap each other, i.e. centers of coil 22 and Lr 210 can be aligned, in order to meet one of the effective charging criteria. To ensure the alignment, the enclosure of repeater 200 can be marked with a layout that indicates to a user, the optimal place for positioning device 20 on top of repeater 200 so as to gain effective charging. However, the wireless power charging system may be adapted to provide power charging even if device 20 is not precisely positioned on top of repeater 200 as depicted in FIG. 1.

In some exemplary embodiments, both Lr 210 and Lt 100 may be flat spiral air core coils that allows for relatively high coupling between Lr 210 and Lt 100 despite a thickness of medium 10. In the embodiment depicted in FIG. 1, the coupling factor between Lr 210 and Lt 100 may be greater than 0.25, whereas the coupling between typical coil 22 and Lr 210 can be greater than 0.15.

In some exemplary embodiments, transmitter 100 comprises a transmitter ferrite 119, which can be a layer made of ferrite material with suitable magnetic characteristics of permeability & core losses. One technical reason for utilizing the transmitter-ferrite 119 is providing a buffer for protecting transmitter-electronics from inductive energy. Another technical reason for utilizing the transmitter-ferrite 119 can be to increase the magnetic field facing repeater 200; thus, the inductance of the Lt 110. Transmitter-ferrite 119 properties such as thicknesses, flexibility, fragility a combination thereof, or the like may be dictated by an application in which the system of the present disclosure is provided. For example, the thickness and the material from which the medium 10 is made of. Since Lt 110 may have a shape of a circle, the shape of transmitter-ferrite 119 may also be a circle, having a diameter equal to or bigger than the Lt 110 external diameter. Alternatively, transmitter-ferrite 119 may have a shape of any geometric plane figure as long as Lt 110 external diameter is an inscribed circle within the geometric plane figure.

In some exemplary embodiments, repeater 200 may comprise a repeater ferrite 219, which can be a layer made of ferrite material similar to transmitter-ferrite 119. One technical reason for utilizing the repeater ferrite 219 is to provide a buffer for protecting the electronic circuitry of device 20 from inductive energy. Another technical reason for utilizing the repeater ferrite 219 may be to increase the magnetic field facing the transmitter 100, thereby the inductance of Lr 210. Repeater ferrite 219 can possess properties similar to the properties of transmitter-ferrite 119. Since Lr 210 can have a shape of a circle, the shape of repeater ferrite 219 can also be a circle having a diameter equal to or bigger than the Lr 210 external diameter. Alternatively, repeater ferrite 219 may have a shape of any geometric plane figure as long as Lr 210 external diameter is an inscribed circle within the geometric plane figure.

In some exemplary embodiments of the disclosed subject matter, at least one resonance capacitor (Ct) 130 can be connected in series to Lt 110 and at least one resonance capacitor (Cr) 230 can be connected in series to Lr 210. The resonant capacitors can be placed inside the inner diameter space of each coil accordingly. Alternatively, the resonant capacitors can be placed next to the outer diameter space of each coil accordingly, or elsewhere within the respected enclosure.

The repeater ferrite 219 of the present disclosure increases the coupling factor of coil 22 and Lr 210 to better simulate a behavior of a coil 22 with commercially available standard transmission coil, and also reduces any direct coupling from Lt 110 to coil 22, which is not desired in the system of the present disclosure. In addition, the resonance capacitors of both the transmitter 100 and repeater 200 are intended to stabilize the system operational point, dependency of coil 22 loads and allow high efficiency in power transfer.

In some exemplary embodiments, a combination of the transmitter 100 and the repeater 200 LC circuits, when no load is present, can form two distinct resonance frequencies, hereinafter, joint resonance frequencies (JRF). The first resonance frequency of the JRF, may be adjacent to transmitter 100 LC circuit's resonance frequency; however, lower in any case. The second resonance frequency of JRF may be adjacent to repeater 200 LC circuit's resonance frequency, however higher in any case. It should be noted that the phrase "a combination of the transmitter 100 and the repeater 200 LC circuits" refers in the present disclosure to a state where transmitter 100 and repeater 200 face each other, such as depicted in FIG. 1 and power is applied to the transmitter 100. It should also be noted that the second resonance frequency, i.e. higher resonance frequency, shall be regarded as the present disclosure system main resonance frequency (MRF).

The resonance frequency of transmitter 100 LC circuit and repeater 200 LC circuit are designed in such a way that their JRF, with no Coil 22 on them, is tuned to be a specific range (typically 20-50 kHz) lower than the desired maximal operational frequency of the transmitter 100 and is higher than coil 22 resonance frequency.

In some exemplary embodiments, an operating frequency (OPF) typically range between 121 kHz-140 kHz, where the lower OPF of the range may be 4 kHz higher than the MRF, wherein the maximal frequency may be 5 kHz lower than a regulatory limit. Alternatively, the maximal OPF may be set below the MRF and the regulatory maximal frequency limit. It will be understood that the system of the present disclosed avoids operation at resonance frequencies. The preferred OPF of the present disclosure system may be at a range of frequencies that are shifted to a frequency either lower or higher than the main resonance frequency (MRF).

Figure 2:
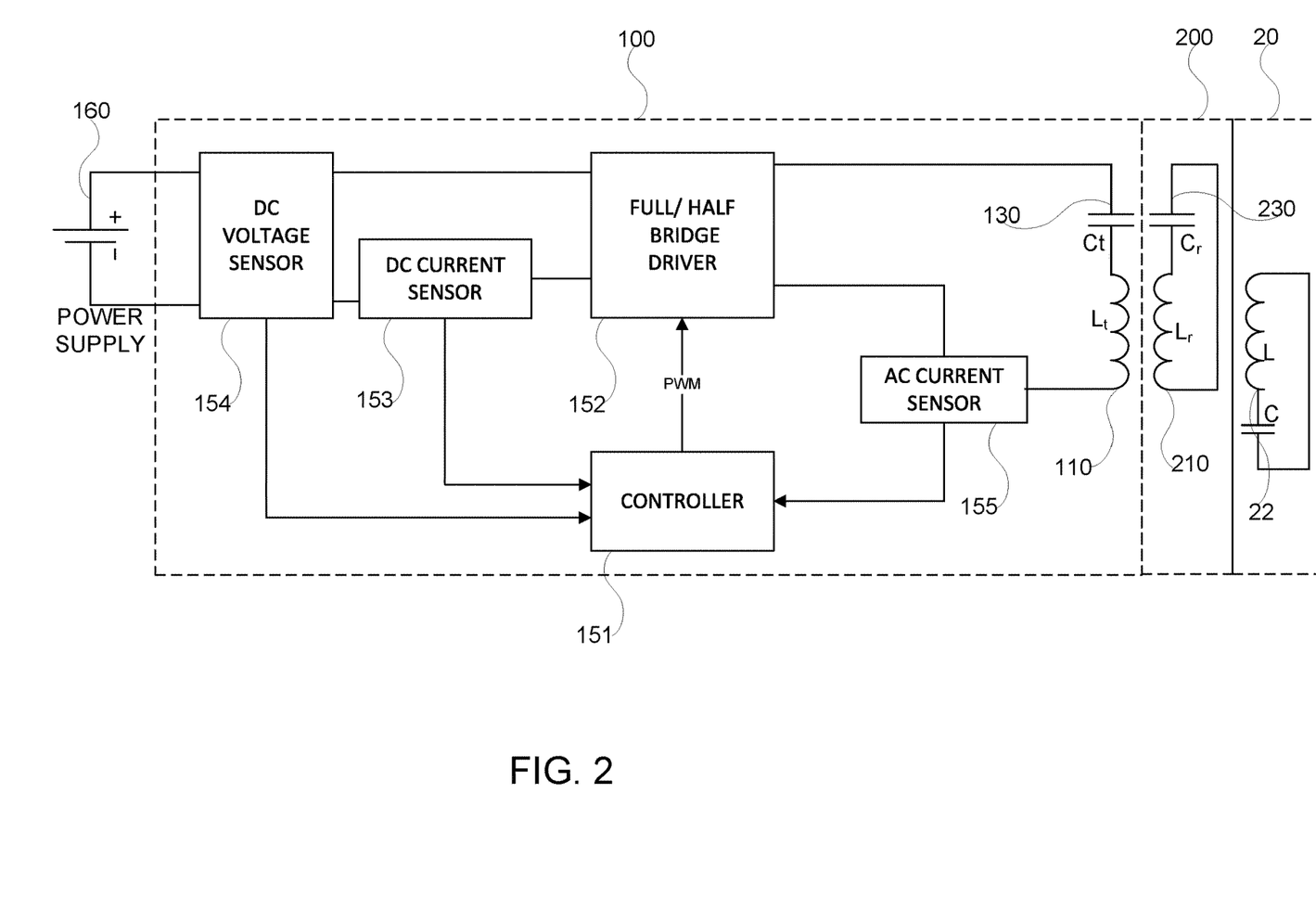
FIG. 2 shows a block diagram of a system for wireless power charging, in accordance with some exemplary embodiments of the disclosed subject matter.

Referring now to FIG. 2 showing a block diagram of a wireless power charging system that use a repeater 200, in accordance with some exemplary embodiments of the disclosed subject matter. The system for wireless power charging comprising a PS 160, a transmitter 100 and a repeater 200 for charging device 20 by through receiver coil 22.

In some exemplary embodiments, the system can be adapted to utilize transmitter 100 for charging a user's chargeable device, such as device 20 via repeater 200. The repeater 200 can be passive electronic circuit acting as repeaters for wirelessly transmitting charging energy to device 20 or the like. Repeater 200 can comprise at least one coil (inductor) Lr 210 and at least one capacitor Cr 230 that form a repeater LC resonance circuit.

In some exemplary embodiments, transmitter 100 can comprise, at least one Lx 110 coil, and at least one capacitor Ct 130, configured for inducing current in the coil of repeater 200. Transmitter 100, further comprises a controller 151; a full and/or half bridge driver 152, a DC current sensor 153, a DC voltage sensor 154, and an AC current sensor 155.

Controller 151 can be a central processing unit (CPU), a microprocessor, an electronic circuit, an integrated circuit (IC), or the like. Additionally, or alternatively, controller 151 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). In some exemplary embodiments, controller 151 can be utilized to perform computations required by transmitter 110 or any of its subcomponents.

In some exemplary embodiments of the disclosed subject matter, the controller 151 can be configured to utilize sensors 154 and 153 for determining DC voltage across PS 160 and DC current supplied by PS 160, respectively. Controller 151 can also be configured to utilize sensor 155 for determining AC current supplied to Lt 110. Alternatively, output AC current can be determined by sensing instantaneous current flowing to the driver from the power supply with DC current sensor 153. It should be noted that determining AC current parameters can comprise peak current, average of absolute current, RMS current, amplitude of first harmonic, and any combination thereof, or the like.

In some exemplary embodiments, controller 151 comprises a semiconductor memory component (not shown). The memory may be persistent or volatile memory, such as for example, a flash memory, a random-access memory (RAM), a programmable read only memory (PROM), a re-programmable memory (FLASH), and any combination thereof, or the like.

In some exemplary embodiments, the memory can be configured to retains program code to activate controller 151 to perform acts associated with determining a pulse width modulation (PWM) signal that controls the full or half bridge driver 152. Additionally, or alternatively, the memory of controller 151 may retain instructions and code adapted to cause the controller 151 to execute methods, such as the method depicted in FIG. 3.

In some exemplary embodiments, driver 152 can adjust the output current flowing through Lt 110, i.e. power provided by the transmitter 100, by modulating the OPF and/or duty cycle of the current flowing through Lt 110. Additionally, the PWM signal generated by the controller 151 tunes the modulation to satisfy the wireless charging needs of a load, such as device 20. It should be noted that the PWM signal frequency and duty cycle can be set by controller 151, within the OPF range, as previously described. Additionally, controller 151 can change the OPF within the OPF range based on the power demand of the device 20.

In some exemplary embodiments, the controller 151 can utilize its memory to retain, connectivity software, monitoring information, configuration and control information and application associated with charging management of present disclosure system.

In some exemplary embodiments, the controller 151 can be configured to communicate with device 20 based on protocols that comply with the following communications standards: power matters alliance (PMA); wireless power consortium (WPC) and AirFuel Alliance. According to these communication methods, but not limited to, the controller 151 can be configured to acquire user's credentials from device 20 in order to authenticate users for granting and regulating charging services. Additionally, or alternatively, the controller 151 can be also configured to acquire from device 20, its power requirements as well as a Q factor of the receiver coil 22 as provided by the manufacturer of device 20.

It will be noted that the solutions/procedures/methods described hereinafter are not limited to the system depicted in FIGS. 1-3 of the present disclosure, and in fact, may apply to enhance the operation of commercially available inductive power transfer systems. The description of the embodiments hereinafter refers to elements of the system depicted in FIGS. 1-3, that are used as examples for describing the following solutions/procedures that may apply to other inductive power transfer systems.

It will also be noted that the present disclosure may utilize the solutions, procedures and or methods described in patent application PCT/IL2018/050258 and PCT/IL2018/050266 that are herein incorporated by reference in their entirety into the specification, to the same extent as if it was specifically and individually indicated to be incorporated herein by reference.

The components detailed above may be implemented as one or more sets of interrelated computer instructions, executed for example by controller 151 or by another processor to for detecting foreign objects that may affect the magnetic field. The components may be arranged as one or more executable files, dynamic libraries, static libraries, methods, functions, services, or the like.

The wireless power consortium (WPC) suggested obtaining a Q factor of the receiver (charged device) and measuring a Q factor, by a host transmitter, while the device is present on it. And compare the two Q factors after normalizing the obtained Q factor of the receiver according to the host. It should be noted that, a measured Q factor smaller than the normalized obtained Q factor, indicates, foreign object presence. The obtained Q factor is a number retained in the device and communicated by it to the host transmitter upon charging initialization. The Q factor number is a vendor specific value, typically resulting from measuring Q factor of a reference transmitter when a given vendor device is placed on it and operating with the reference transmitter. The obtained Q factor can be normalized by the host transmitter in order to make up for the different characteristics between the reference transmitter and the host transmitter.

Foreign objects present within the electromagnetic field of a wireless charging system can cause efficiency loss and possible safety hazards by absorbing portions of the electromagnetic field and heating up. Typically, foreign objects are unwanted metal objects such as coins, paper clips or metal objects attached to a cellphone case may be situated between, or near, a user's device (e.g. device 20) and repeater 200.

While the WPC addresses the foreign objects detection only for systems consisting of transmitter and receiver, the objective of the present invention is providing foreign objects detection for systems that also comprise at least one repeater that doesn't have galvanic connection with a host transmitter. In some exemplary embodiments of the disclosed subject matter; the transmitter can be at least one transmitter 100 (of FIGS. 1 & 2); the repeater can be repeater 200 (of FIGS. 1 & 2); the device can be device 20 (of FIGS. 1 & 2); a combination thereof, or the like. It should be noted that, that device 20 may be any commercially available chargeable device that comprise a receiver coil, such as coil 22.

Another objective of the present disclosure is guarding against foreign object issue by causing the transmitter 100 to either shut down or minimize power transfer following foreign object detection.

Figure 3:
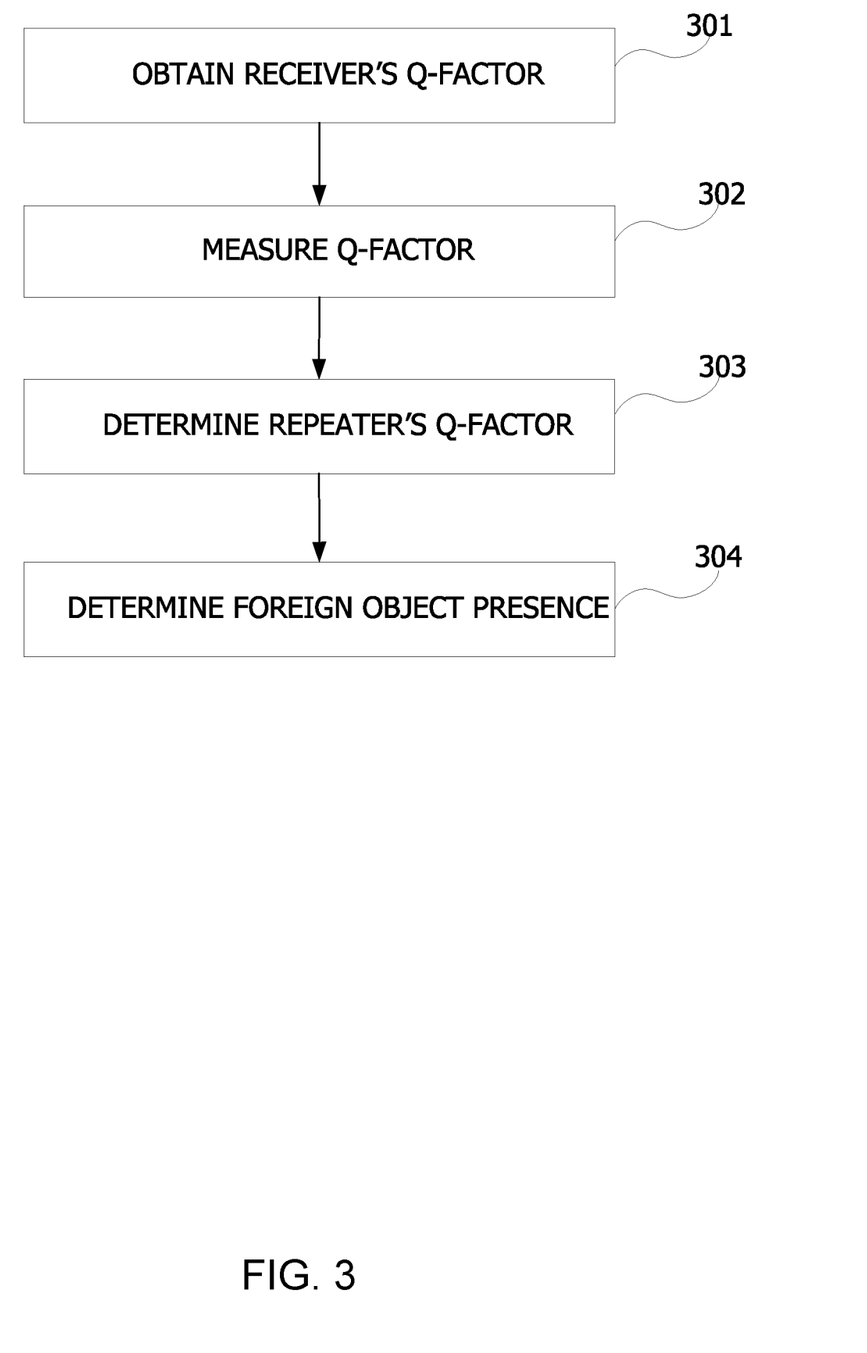
FIG. 3 shows a flowchart diagram of a method, in accordance with some exemplary embodiments of the disclosed subject matter.

Referring now to FIG. 3 showing a flowchart diagram of a method for determining a Q-factor, in accordance with some exemplary embodiments of the disclosed subject matter. The method for determining a Q-factor may be utilized for foreign objects detection in wireless charging systems that comprise at least one transmitter 100 (of FIGS. 1 & 2); at least one repeater 200 (of FIGS. 1 & 2); and device 20 (of FIGS. 1 & 2). Wherein the transmitter and repeater don't have galvanic connection, thus a Q factor of repeater 200 can't be directly measured, and the only possible measurement is of host transmitter 100. It should be understood that, the foreign objects concerning the present disclosure are objects on or near either repeater 200 and or device 20.

In step 301, a receiver's Q-factor [$Q_{wpc}$] can be obtained. In some exemplary embodiments, controller 151 of the transmitter 100 can obtain the $Q_{wpc}$ from device 20. The transmitter 100, also referred herein as host transmitter, can be configured to communicate with device 20 based on protocols known in the art. In addition to information detailed in this present disclosure the host transmitter can also be configured to obtain the receiver's $Q_{wpc}$ of device 20. In some exemplary embodiments, $Q_{wpc}$ number is a value registered in device 20 by the manufacturer of device 20. The $Q_{wpc}$ is indicates the Q factor of the device, while operating with a known reference transmitter.

In step 302, a Q-factor can be measured. In some exemplary embodiments, the Q-factor measurement comprising excitation, by the host transmitter, of the system's resonance circuits for a given period of time. Upon the end of the excitation, power charged in the capacitors and inductors decays. The decay pattern, in relation to a timeline, is indicative of the Q factor of the overall system, i.e. host transmitter 100, repeater 200 and the receiver.

In some exemplary embodiments, the excitation is comprised of transmitting, by the host transmitter 100, a sequence of pulses in at least one determined frequency. It should be noted that, the system of the present disclosure comprises two resonance circuits, i.e. Lt 110 plus Ct 130 for the transmitter 100 and Lt 210 plus Ct 230 for the repeater 200, in addition to the L22 and C22 of the receiver. It will be concluded, from the structure of the present disclosure (FIG. 1), that two distinct JRFs (first JRF and second JRF) can be formed at the excitation.

It should be noted that, for a given installation of the transmitter 100 and repeater 200 the first JRF is known to the host transmitter while the second JRF can be determined by the transmitter 100 based on measurement of the decay of the oscillation frequency.

In one exemplary embodiment, the excitation comprises two sequences of pulses, wherein one sequence has a base frequency associated to the known first JRF and the other sequence have a base frequency associated to the determined second JRF. Following the end of the excitation the transmitter 100 can utilize any combination of its sensors, i.e. sensor 153, 154 and 155, for facilitating the measurement of the decay pattern/time for both sequences.

In another exemplary embodiment, the excitation comprises one sequence of pulses, wherein the sequence has a base frequency associated to the known first JRF. Following the end of the excitation the transmitter 100 can utilize any combination of its sensors, for facilitating the measurement of the decay pattern/time the sequence.

In yet other exemplary embodiment, the excitation comprises one sequence of pulses, wherein the sequence has an, empirically achieved, frequency that is configured to trigger both JRFs. Following the end of the excitation the transmitter 100 can utilize any combination of its sensors, for facilitating the measurement of the decay pattern/time for both JRFs.

In some exemplary embodiments, any combination of the listed above embodiments for measuring the decay pattern/time may be used.

In step 303, a repeater's Q-factor can be determined. In some exemplary embodiments, the repeater Q factor (Qr) can be determined by utilizing the following mathematical equations that use information obtained from decay pattern/time measurements in addition to the obtained Q factor of the receiver.

It should be noted that, parasitic resistances including foreign-objects reflected resistance are generally small compare to impedance of capacitors and inductors (i.e. high Q system). Thus, implying Q factor closer to a system with no parasitic resistances, but yet smaller decay time, therefore the equation shall have this format:

$$\text{real}(e^{(\pm i w_{jn} - p_n)t})$$

Were $\omega_{jn}$ are the JRFs of the system; $\rho_n$ are decay factors for each JRF. Since there are four solutions, i.e. two phases for each JRF. The solutions may be designated as $w=w_{jn}+i\rho_n$ were n is the number of JRF. The following equation [Y] defines a relationship (proximity) of an excitation frequency [w] with a self-resonance frequency, of a given resonance circuit. Therefore, taking into account the impedance of the resonance circuit. Were $w_x$ is the JRF of a specific circuit, e.g. transmitter or repeater, of each circuit, and w is the excitation frequency.

$$Y_x = 1 - \left(\frac{w_x}{w}\right)^2$$

The following equation represents the time after excitation ended:

$$\left(iwL_p Y_p(w) + R_p + \frac{w^2 L_p L_r K_{pr}^2}{iwL_r Y_r(w) + R_r}\right) * I(w) = 0$$

Where, $K_{pr}$ is the coupling between Lt 110 coil and Lr 210 coil. After transforming the above:

$$\left(Y_p(w) - \frac{i}{Q_p}\right)\left(Y_r(w) - \frac{i}{Q_r}\right) - k^2 = 0$$

Were $Q_x = \frac{wL_x}{R_x}$ and $k = K_{pr}$

After analyzing $Y_x(w)$ when substituting $w_j \rightarrow w_j + i\rho$ the following may be obtained.

$$Y_x(w) = 1 - \left(\frac{w_x}{w_j + i\rho}\right)^2 \cong 1 - \left(\frac{w_x}{w_j}\right)^2 + 2i\rho\frac{w_x^2}{w_j^3} = Y_p(w_j) + 2i\rho\frac{w_x^2}{w_j^3}$$

$$\left(Y_p(w_j) + 2i\rho\frac{w_p^2}{w_j^3} - \frac{i}{Q_p}\right)\left(Y_r(w_j) + 2i\rho\frac{w_r^2}{w_j^3} - \frac{i}{Q_r}\right) - k^2 = 0$$

$$Y_p(w_j)Y_r(w_j) - k^2 + \left(2i\rho\frac{w_p^2}{w_j^3} - \frac{i}{Q_p}\right)Y_r(w_j) +$$

$$\left(2i\rho\frac{w_r^2}{w_j^3} - \frac{i}{Q_r}\right)Y_p(w_j) + O(Q^{-2}) = 0$$

Neglecting last term since it substantially smaller, shall yield:

$$\left(2i\rho\frac{w_p^2}{w_j^3} - \frac{i}{Q_p}\right)Y_r(w_j) + \left(2i\rho\frac{w_r^2}{w_j^3} - \frac{i}{Q_r}\right)Y_p(w_j) \cong 0$$

$$\rho = \frac{Y_r\frac{R_p}{L_p} + Y_p\frac{R_r}{L_r}}{2((1-Y_p)Y_r + (1-Y_r)Y_p)}$$

Defining a Q factor for first JRF as:

$$Q_j = \frac{w_j}{\rho}$$

$$\frac{1}{Q_j} = \frac{\frac{Y_r}{Q_p} + \frac{Y_p}{Q_r}}{((1-Y_p)Y_r + (1-Y_r)Y_p)}$$

The above yields two equations for $\rho_1$ & $\rho_2$ that relate to the two osculation modes. The value of $\rho_1$ & $\rho_2$ can be extracted from the decay factor. In some exemplary embodiments, the measurement of the decay factor can be based on measurement of an amplitude of the decay pattern $A_{n,k}$ for the two frequencies $\omega_{jn}$ at two different time points k=1 and k=2 with Δt between them, thus the decay factor is calculated as follows:

$$\rho_n = \frac{\ln\left(\frac{A_{n,1}}{A_{n,2}}\right)}{\Delta t}$$

In some exemplary embodiments, solving the two linear equations yields $R_p$ and $R_r$ and their matching $Q_p$ and $Q_r$. It should be noted that, for a specific installation (practical system) the values of $R_p$ and $Q_p$ are constant, thus not effected by foreign objects placed on the repeater due to the structure of the system (FIG. 1). Therefore, allowing the use of only one equation with single decay measurement in higher resonance frequency for solving the above equations.

In step 304, a foreign object presence may be determined. In some exemplary embodiments, presence of foreign object may be determined, if the repeater circuit Q factor (Qr), previously determined in step 303, is smaller than a corrected (normalized) Q factor (Qwpc), previously obtained from the receiver in step 301.

It will be noted that, the repeater's effective resistance (Rr), as previously determined in step 303, is equivalent to the repeater's Q factor, since Qr=2πfL/Rr for given [f] and [L]. It should also be noted that, the reported Qwpc, by the receiver, requires correction in order to compensate for the different magnetic characteristics between the reference transmitter (described above) and the repeater magnetic circuit.

In some exemplary embodiments, the compensation takes in to account the inductance of repeater and host transmitter coils, the reported parasitic resistance of the reference transmitter coil the geometric differences that affect the coupling to typical receiver coils; and a combination thereof, or the like.

In some exemplary embodiment the following equation can be used to calculate a corrected $Q_{wpc}'$ of the reported $Q_{wpc}$:

$$Q'_{wpc} = \frac{w_j L_r}{\left(\frac{w_{ref} L_{ref}}{Q_{wpc}} - R_{ref}\right) * Sc + R_r}$$

In the above equation, $R_{ref}$, $w_{ref}$ & $L_{ref}$ are respectively the parasitic resistance, resonance frequency and the inductance of the reference transmitter. $R_r$, $w_1$, $L_r$, Sc are respectively the repeater 200 parasitic resistance (without load); JRF and repeater 200 inductance; a scaling factor to compensate for differences between reference transmitter coil and repeater coil dimensions.

In some exemplary embodiments of the disclosed subject matter, $Q_{wpc}' > Q_r$ is an indication of foreign object presence, which will consequently cause the transmitter 100 to either shut down or minimize its power transfer.

In some exemplary embodiments, steps 302 to 304 may be repeated periodically while charging the same device 20. Additionally, or alternatively, steps 302 to 304 may be repeated after detection of foreign object. Optionally, the entire method, i.e. steps 301 to 304 may be repeated after detection of foreign object.

In some exemplary embodiments of the disclosed subject matter, the foreign-object detection method, may be based on the amplitude of either the voltage or current of Lt 110, during a predefined time interval after the end of the excitation. Where the excitation is at the higher resonance frequency, i.e. yields most of excitation at the higher frequency resonance. In some exemplary embodiments, the value, i.e. amplitude, can be compared to a predetermined threshold. Subsequently, if the amplitude is lower than the threshold, indicates that a foreign-object is present. It will be noted that, the determination of a threshold value may be based on measurement of the response amplitude when no device is placed on the repeater. Additionally, or alternatively, the foreign-object detection method described above may utilized in combination with all or part of the steps depicted in FIG. 3.

In some exemplary embodiments of the disclosed subject matter, the foreign-object detection method can be derived from measuring the higher JRF of the system. That frequency may be compared to a reference measurement of JRF, i.e. JRF measurement while no device or objects are placed on the repeater 200. In this exemplary embodiment, a presence of foreign-object will cause the higher JRF of the system to be greater than a permitted threshold, above the reference measurement. In some exemplary embodiments, the permitted threshold may be set according to the type of device placed on the system. It will be noted that, part of the WPC protocol, devices, such as device 20, incorporate in their communication with the host transmitter, information that allows transmitters, such as transmitter 100, to distinguish between device type.

As an example, a phone from vendor X creates a reduction of resonance frequency of typically 3 kHz. If the specific phone is detected, the permitted threshold is set to −1 kHz. Thus, if the measured JRF is greater than 1 khz below the reference JRF, a foreign-object is detected. In contrast, a phone from vendor Y having a typical resonance increase of 1 khz, the threshold may be set to +3 kHz Thus, if the measured JRF is greater than 3 khz above the reference JRF a foreign-object is detected.

In some exemplary embodiments of the disclosed subject matter, any combination of the above methods and any combination of the steps depicted in FIG. 3 may be used for detecting foreign-objects.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A method for detecting foreign objects by a host transmitter inductively coupled with a repeater, the method comprising:

obtaining a Q-factor from a receiver placed on the repeater;

measuring a decay pattern of at least one joint resonance frequency (JRF);

determining a Q-factor of the repeater based on the decay pattern; and determining foreign object presence based on the Q-factor of the repeater and a corrected Q-factor obtained from the receiver.

2. The method of claim 1, wherein said measuring a decay pattern further comprising excitation, by the host transmitter, of the transmitter primary coil and measuring the decay pattern after the excitation, wherein the excitation comprising at least one sequence of pulses each having a base frequency, and wherein the decay pattern has an oscillation frequency corresponding a first JRF and a second JRF.

3. The method of claim 2, wherein the base frequency is empirically achieved, frequency, and wherein said measuring the decay pattern after the excitation, comprising measuring the decay pattern of both JRFs for each sequence.

4. The method of claim 2, wherein the base frequency is substantially near the first JRF, and wherein said measuring the decay pattern after the excitation, comprising measuring the decay pattern of the first JRF.

5. The method of claim 4, wherein the excitation comprising having an additional sequence of pulses having a base frequency substantially near the second JRF, and wherein said measuring the decay pattern after the excitation, comprising measuring the decay pattern of the second JRF for each sequence.

6. The method of claim 1, wherein determining the Q-factor of the repeater is also based on a decay factor of the decay pattern for an oscillation of at least one JRF.

7. The method of claim 1, wherein said determining foreign object presence further comprises calculating the corrected Q-factor obtained from the receiver by the host transmitter.

8. The method of claim 1, wherein said determining foreign object presence further comprises comparing the corrected Q-factor to the Q factor of the repeater, and wherein at least one foreign object presence is detected if the Q factor of the repeater is smaller than the corrected Q-factor.

9. The method of claim 8, wherein after said at least one foreign object presence is detected the host transmitter either stop or minimize powering the repeater.

10. The method of claim 8, wherein the method is periodically repeated upon said at least one foreign object presence is detected.

11. The method of claim 1, wherein the method is periodically repeated.

* * * * *